United States Patent [19]

Gray

[11] Patent Number: 4,983,085

[45] Date of Patent: Jan. 8, 1991

[54] THREADED LOCKABLE FASTENER WITH SWAGED COLLAR

[75] Inventor: Warren E. Gray, Woodland Hills, Calif.

[73] Assignee: Northrop Corporation, Hawthorne, Calif.

[21] Appl. No.: 412,371

[22] Filed: Sep. 26, 1989

[51] Int. Cl.⁵ .................................................. F16B 19/00
[52] U.S. Cl. ..................................... 411/361; 411/336; 411/399
[58] Field of Search ............................................ 411/1-5, 411/277-279, 336, 360, 361, 399, 411, 424, 937.2, 938

[56] References Cited

U.S. PATENT DOCUMENTS

| | | | |
|---|---|---|---|
| 2,484,645 | 10/1949 | Baumle | 411/311 |
| 2,895,368 | 7/1959 | Place | 411/399 X |
| 3,418,012 | 12/1968 | Torre | 411/411 X |
| 3,464,472 | 9/1969 | Reynolds | 411/336 |
| 3,842,878 | 10/1974 | Duer | 411/276 |
| 3,858,942 | 1/1975 | Humlong | 411/938 X |
| 4,260,005 | 4/1981 | Stencel | 411/281 X |
| 4,649,727 | 3/1987 | Gray | 411/336 X |
| 4,659,267 | 4/1987 | Uno et al. | 411/5 |
| 4,682,520 | 7/1987 | Gray | 81/471 |
| 4,759,237 | 7/1988 | Fauchet et al. | 411/3 X |
| 4,797,022 | 1/1989 | Crigger | 411/399 X |

Primary Examiner—Gary L. Smith
Assistant Examiner—Suzanne L. Dino
Attorney, Agent, or Firm—Terry J. Anderson; Robert B. Block

[57] ABSTRACT

A fastening assembly includes a bolt and a malleable fastener. The bolt has a head at one end and either threads or circumferentially extending grooves adjacent the other end. The bolt further includes a plurality of axially extending grooves located on the bolt between the bolt head and the threads or circumferentially extending grooves. The malleable fastener is capable of being swaged from an initial state to a swaged state. In the initial state the fastener is essentially shaped as a hollow collar having an outside surface and an interior surface with the collar sized and shaped to freely slide over the bolt. In the swaged state the interior surface of the collar intimately contacts and irreversibly locks against both axial and rotational movement with respect to the bolt by assuming a complementary shape to the bolt about both the axial grooves and the threads or the circumferentially extending grooves.

15 Claims, 2 Drawing Sheets

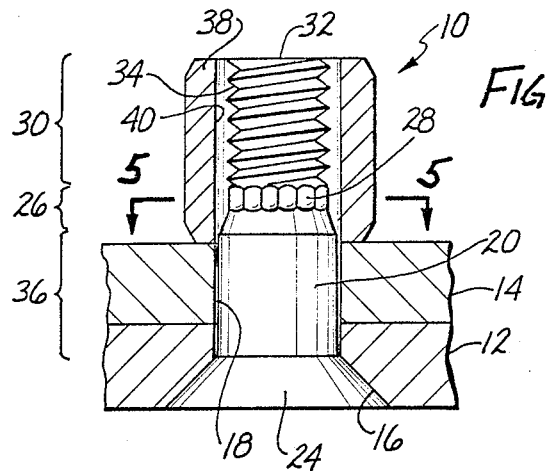
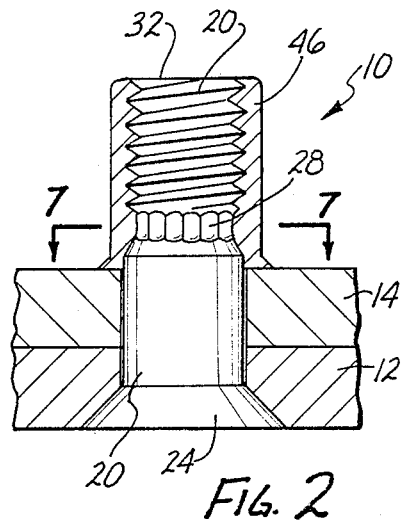
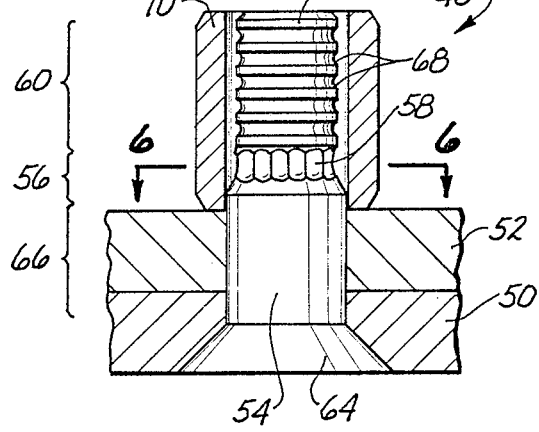
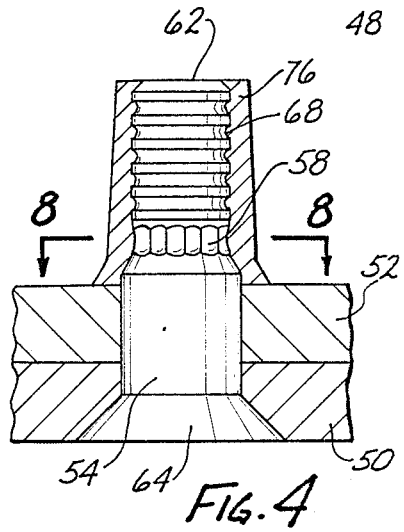
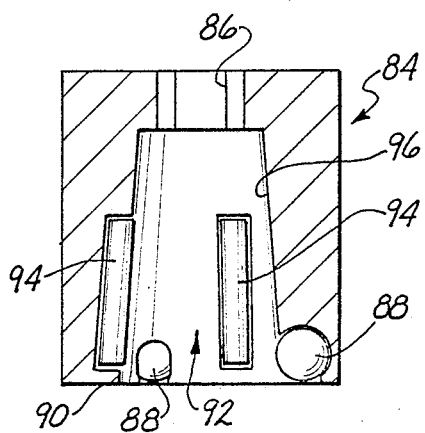

THREADED LOCKABLE FASTENER WITH SWAGED COLLAR

BACKGROUND OF THE INVENTION

This invention relates to an improved fastening assembly for holding work pieces together. The fastening assembly of the invention utilize a non-threading collar which is irreversibly locked to a bolt with respect to both axial movement along the length of the bolt and rotational movement about the axis of the bolt.

A variety of fastener assemblies are known. Ubiquitously used are nut and bolt assemblies. The nut is threaded onto a bolt to hold work pieces together. Under normal conditions the nut will be retained on the bolt. However, under certain conditions including hostile environmental conditions the nut can work free from the bolt. This can lead to catastrophic failure of the assembly on which the nut and bolt fastener is utilized.

In my prior U.S. Pat. No. 4,682,520, entitled MECHANICALLY LOCKABLE FASTENER ASSEMBLIES, which issued on July 28, 1987, from application Ser. No. 671,823, filed Nov. 15, 1984, assigned to the same assignee as this application, the entire contents of which are herein incorporated by reference, I describe various prior known fastening assemblies. Further, in that patent I disclose a mechanically lockable fastener assembly which is simple in operation and construction. Further, this mechanical lockable fastener assembly is particularly useful for use in hostile environments because the positive locking of the nut of that assembly to the bolt of that assembly.

BRIEF SUMMARY OF THE INVENTION

The present invention is directed to further improved fastening assemblies which provide for irreversible attachment of a non-threading fastening element, as for instance a malleable collar, to a further fastening element, as for instance a bolt.

A fastening assembly of the invention includes an elongated first fastening element having ends and a malleable second fastening element. The second fastening element is attached to the first fastening element for holding work pieces together. A retaining means is located on one of the ends of the first fastening element for maintaining the first fastening element against axial movement in a first direction in a hole in work pieces to be fastened. The elongated first fastening element can be viewed as having at least several zones including a first zone and a second zone. The first zone is located between the retaining means and the second zone. The first zone includes a first means thereon for providing a gripping surface opposing rotation about the first fastening element. The second zone includes a second means thereon for providing a gripping surface opposing axial movement along the first fastening element. The second fastening element exists in two states or configurations. A first of these states or configurations comprises an initial state and a second of these states or configurations comprises a swaged state. In the initial state the second fastening element is shaped essentially as a hollow collar having an outside surface and an interior surface. The collar is sized and shaped to freely slide on the first fastening element over both the first means on the first zone of the first fastening element and the second means on the second zone of the first fastening element. In the swaged state the interior surface of the second fastening element intimately contacts and assumes a complementary shape to the first fastening element about both its first and second zones. In the swaged state the second fastening element is prohibited from rotation on the first fastening element by the complementary shape of the interior surface of the second fastening element interlocking with the first means on the first fastening element and further prohibited from axial movement along the first fastening element by the complementary shape of the interior surface of the second fastening element interlocking with the second means on the first fastening element.

In an embodiment of the invention the first means for opposing rotation about the shank of the first fastening element comprises axially extending grooves on the first fastening element. In an embodiment of the invention the second means for opposing axial movement along the shank of the first fastening element comprises helical threads or the first fastening element. In a further embodiment of the invention the second means for inhibiting axial movement along the first element comprises a plurality of circumferentially extending grooves axially displaced in an array along the length of the second zone of the first fastening element. In each of these embodiments the first fastening element can include a third zone located between the first zone and the retaining means with this third zone being a smooth cylindrical area for closely fitting in a hole in the work piece to be fastened.

In an embodiment of the invention the outside surface of the second fastening element in the initial state is polygon in shape in cross section. In a further embodiment of the invention the outside surface of the second fastening in the initial state is circular in cross section.

The second fastening element is fixedly attached to the first fastening element via a swaging tool. The swaging tool has a hollow interior with a means located in the hollow interior for contacting the outside surface of the second fastening element and inwardly crimping the second fastening element into the first fastening element to distort the interior surface of the second fastening element into intimate contact the first fastening element. As so swaged, the second fastening element intimately contacts and assumes a complementary shape to the first fastening element about both the first means which opposes rotation of the second fastening element about the first fastening element and the second means which opposes axial movement of the second fastening element about the first fastening element.

BRIEF DESCRIPTION OF THE DRAWINGS

This invention will be better understood when taken in conjunction with the drawings wherein:

FIG. 1 is a side elevational view in partial section of a first fastener assembly of the invention illustrating a collar of that fastener assembly in an initial state or configuration;

FIG. 2 is a side elevational view in partial section of the fastener of FIG. 1 illustrating the collar of that fastener assembly in a swaged or locked state or configuration with respect to a bolt of that fastener assembly;

FIG. 3 is a side elevational view in partial section of a further fastening assembly of the invention illustrating a collar of that further fastening assembly in an initial state or configuration;

FIG. 4 is a side elevational view in partial section of the fastener assembly of FIG. 3 illustrating the collar of that further fastener assembly in a swaged or locked state or configuration with respect to a bolt of that fastener assembly;

FIG. 10 is a side elevational view in partial section of a further swaging tool for swaging a collar of a fastener assembly of the invention to a bolt or pin of a fastener assembly of the invention.

This invention utilizes certain principles and/or concepts as are set forth in the claims appended hereto. Those skilled in the fastening arts will realize that these principles and/or concepts are capable of being utilized in a variety of embodiments which may differ from the exact embodiment utilized for illustrative purposes herein. For this reason this invention is not to be construed as being limited to only the illustrative embodiments, but should only be construed in view of the claims appended hereto.

DETAILED DESCRIPTION OF THE INVENTION

Figure 5:
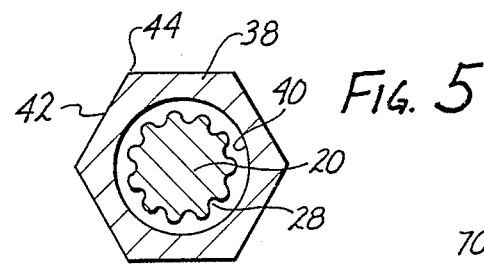
FIG. 5 is a plan view about the line 5—5 of FIG. 1.

A first fastening assembly 10 of the invention is seen in FIGS. 1 and 2 and in part in FIG. 5. The fastening assembly 10 is utilized to fasten a first work piece 12 to a second work piece 14. The work piece 12 has a hole 16 drilled therein which has been reamed with a countersink. The work piece 14 has a hole 18 drilled therein which aligns with the hole 16 in the work piece 12. A first elongated fastening element 20 formed as a bolt or pin has a shank 22 having a head 24 thereon. The head fits into the countersunk area of the hole 16 and serves as a retaining means to prevent axial movement of the element 21 in a direction from the work piece 12 towards the work piece 14.

The shank 22 of the first fastening element 20 can be considered as being divided into three zones. The first of these zones identified by bracket 26, includes a plurality of axially extending grooves 28 recessed into the surface of the shank 22. The grooves 28 are arranged in a circumferentially extending array around the shank 22 in zone 26.

A second zone of the shank 22 identified by bracket 30 is positioned adjacent to end 32 of the element 20. The zone 30 of the shank 22 includes a helical thread 34 formed thereon. The remaining or third zone of shank 22 identified by bracket 36 is located between the first zone, zone 26, and the head 24. The zone 36 of the shank 22 is formed as a smooth cylindrical surface for closely fitting in the holes 16 and 18.

A collar 38, seen in sectional plan view in FIG. 5 and in sectional elevational view in FIG. 1, exists in first and second states or configurations. In a first of these states seen in FIGS. 1 and 5, the collar 38 is as manufactured. That is in an unmodified or initial state. In this state the collar 38 has an interior surface 40 which is cylindrical in shape and an exterior surface 42. As is evident in FIG. 5, in cross section the exterior surface 42 of the collar 38 is shaped as a polygon.

The collar or second fastening 38 is sized and shaped with respect to the first fastening element 20 such that it can freely slide over the first and second zones of the first fastening element 20. That is the collar 38 fits over the axially extending grooves 28 as well as the helical extending threads 34.

The axially extending grooves 28 provide a gripping surface or means for preventing rotation about the shank 22. The threads 34 provide a further gripping surface or means opposing axial movement along the shank 22.

Using a swaging tool as, for instance the swaging tool described in my above identified U.S. Pat. No. 4,682,520, the collar 28 can be swaged to the fastening element 20 to permanently lock the collar 38 to the element 20. This is illustrated in FIG. 2.

Utilizing a swaging tool of my Pat. No. 4,682,520, material about apices 44 (as seen in plan view in FIG. 5) of the collar 38 is crimped inward by the swaging tool such that the malleable material of the collar 38 intimately contacts the surface of the first fastening element 20 about its first and second zones 26 and 30 respectively. After swaging the collar is identified by the numeral 46. Thus the collar 38, after being swaged, assumes its second or swaged state as collar 46. The inside surface of the swaged collar 46 is now complementary to the exterior surface of the first fastening element about the first and second zones 26 and 30 of first fastening element 20.

Figure 7:
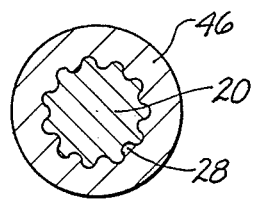
FIG. 7 is a plan view about the line 7—7 of FIG. 2.

The complementary surface of the swaged collar 46 fills the areas in the grooves 28. This locks the swaged collar 46 (as seen in FIG. 7) against rotation about the first fastening element 20 by material of the swaged collar 46 interlocking into the grooves 28. Further (as is evident in FIG. 2), the swaged collar 46 is locked against axial movement along the elongated axis of the first fastening element 20 by material of the swaged collar 46 locking with the helical thread 34.

In swaging the collar 38 to form the swage collar 46 the interior surface 40 of the collar 38 intimately mates with and is complementary to the threads 34 of the element 20. However, the swaged collar 46 cannot be unthreaded in a conventional manner from the element 20. In forming the swaged collar 46 onto the threads 34 the material of the swage collar 46 is frictionally engaged along the totality of the all of the surface of the threads 34 along the totality of the length of the threads 34. This is opposed to a typical nut and bolt interface wherein the majority of the holding force between the nut and bolt resides on only a limited portion of the surface of the first one or two threads of the nut (the first few threads which are positioned in the direction of the head of the bolt).

In the fastening assembly 10, totally contrary to only a one or two thread interlock of a common nut on a bolt, there is an intimate compression of the malleable material of the swage collar 46 against the totality of the threads 34. This forms a very high frictional contact surface between the swage collar 46 and the first fastening element 20.

Because of the intimate gripping of the swage collar 46 to the totality of the surface of the threads 34, the swage collar 46 is prevented from movement along the axis of the element 20 towards its end 32. In addition to this axial lock of the collar 46 to the threads 34, the swaging of the collar 46 to the threads 34 also fixes the swage collar 46 to the threads 34 with respect to rotation of the collar 46 about the element 20.

However, in addition to (but irrespective of) the frictional engagement of the swage collar 46 to the threads 34, any and all rotation of the swage collar 46 with respect to the first fastening element 20 is prevented by the interlocking of the material of the swage collar 46 into the axially extending grooves 28 on the element 20. It is thus evident that when the collar 38 in its initial state is modified to its swaged state, i.e. collar 46, the collar becomes irreversibly attached to the first fastening element 20 and cannot be removed from the element 20. Thus, the two fastened assembly pieces 20 and 38 (46 in its swaged state) are immune to separation by vibration, temperature shock and other hostile environmental forces and are capable of maintaining the work pieces 12 and 14 in an assembled state.

FIGS. 3, 4, 6 and 8 illustrate a further embodiment of the invention. In this embodiment a fastener assembly 48 is utilized to fasten work pieces 50 and 52 to one another. The work pieces 50 and 52 include appropriate holes (not separately identified or numbered) allowing for passing of a first elongated fastener assembly element 54 (also considered as a pin or a bolt) through the work pieces 50 and 52. As with the element 20, the element 54 has a first zone identified by bracket 56 having a plurality of axially extending grooves 58 formed therein. It further includes a second zone identified by bracket 60 intermediate the grooves 58 and one of its ends, end 62. On the other end of the element 54, the element 54 has a retaining means, head 64. In between the head 64 of the element 54 and the grooves 58 is a third zone identified by bracket 66 where the element 54 has a smooth cylindrical surface. As with the zone 36 of the element 20, the material element within zone 66 serves to closely fit into the unidentified holes through the work pieces 50 and 52.

The fastening element 54 includes a plurality of circumferentially extending grooves, collectively identified by the numeral 68. The grooves 68 are axially displaced in an array along the second zone 60 of the element 54. The grooves 68 are not connected in a manner as are the threads 34 of the element 20, but are independent.

Figure 6:
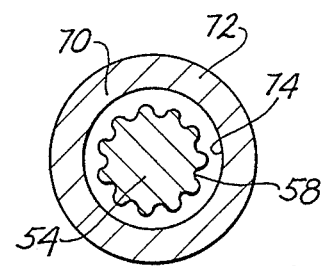
FIG. 6 is a plan view about the line 6—6 of FIG. 3.

A collar 70 shown in its initial state in FIGS. 3 and 6 has an outside surface 72 which is circular in cross section. The collar 70 further includes a circular interior surface 74. The collar 70 is free to slide over the first and second zones 56 and 60 of the first fastening element 54. After positioning on the element 54 the collar 70 is then swaged to the element 54 to change the state of the collar 70 to the swaged collar 76 of FIGS. 4 and 8.

Figure 8:
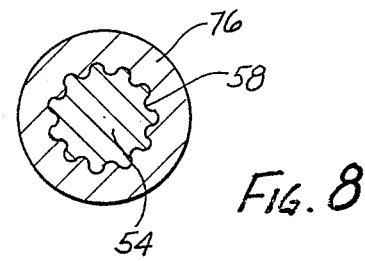
FIG. 8 is a plan view about the line 8—8 of FIG. 4.

In its swaged state, the collar 76 is intimately positioned against the first and second zones 56 and 60 of the element 54 and is complementary to the shape to these zones of the element 54. As is seen in FIG. 8, material from the swage collar 76 fits into the grooves 58 to prevent rotation of the collar 76 about the element 54. Further as is seen in FIG. 4, material from the swage collar 76 fits into the grooves 68 to prevent axial movement of the swaged collar 76 on the element 54. Thus, as with the swage collar 46, the swaged collar 76 is incapable of either rotational or axial movement along the element 54.

The material chosen for the first fastening elements, i.e. the bolt or pins corresponding to the elements 20 and 54, will depend upon the work pieces, i.e. 12 and 14 or 50 and 52, to be fastened together, upon the shear and tensile forces loaded thereon, upon the desired strength of the fasteners and the like. Thus, various materials for these fasteners can be utilized including stainless steel, hardened steel, aluminum, titanium and the like.

The collars or second fastening elements, i.e. the elements 38 and 70, will be chosen to be a material which is malleable with respect to the material for the first fastening elements, i.e. the elements 20 or 54. That is the material for the collar is softer than the material for the elongated pin or bolt such that during swaging of the collar onto the pin or the bolt the interior surface of the collar plastically flows into the various grooves and/or threads on the first fastening element to be complementary to those various grooves or threads and to interlock with the same.

Thus, for instance, if a stainless steel first element, i.e. the element 20, was to be used as part of a fastening assembly of the invention, the collar, i.e. the collar 38, would be selected to be a softer material such as plated and annealed steel. As so selected the collar is malleable with respect to the bolt or pin. In a like manner a hardened aluminum alloy may be utilized for the first fastening element, i.e. the pin or bolt, and a softer aluminum alloy for the second fastening element, i.e. the collar.

In addition to the swaging tool described in my prior U.S. Pat. No. 4,682,520, FIGS. 9 and 10 illustrate further swaging tools for use with the collars of the fastening assemblies of the invention.

Figure 9:
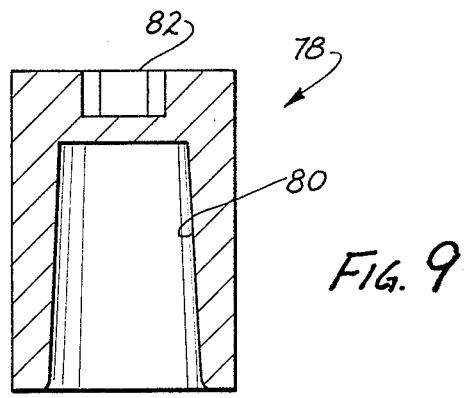
FIG. 9 is side elevational view in section of a swaging tool utilized to swage a collar of a fastener assembly of the invention to a pin or a bolt of a fastener assembly of the invention.

In FIG. 9 a swaging tool 78 is illustrated which would be utilized to modify a collar, as for instance, the collar 70 to the swaged collar 76. The swaging tool 78 has a hollow interior cavity 80. The cavity 80 is conical in shape. The cone shape of the cavity 80 serves as a means for contacting the outside surface of the collar 70 and crimping the material of the collar 70 inward as the tool 78 is driven downwardly axially from the end 62 toward the head 64 of the element 54.

The tool 78 includes a socket 82 for attachment of the swaging tool 78 to an appropriate impact tool for driving the swaging tool 78 onto the collar 70 to convert the collar 70 from an initial state to the swaged state illustrated by the collar 76. In addition to providing for transmitting axial impact loads to the swaging tool 78, the socket 82 can also be utilized to rotate the swaging tool 78 off of the swaged collar 76 when attachment of the collar 76 to the element 54 is completed.

FIG. 10 illustrates a further swaging tool 84 for attaching either the cylindrical collar illustrated by collar 70 or a polygon collar illustrated by collar 38 to an appropriate first elongated fastening element, illustrated by either the first fastening element 20 or the second fastening element 54. As with the tool 78 the tool 84 includes a socket 86 to attach the tool 84 to an appropriate rotary driver.

The tool 84 includes three hardened balls, collectively identified by the numeral 88 (only two of which can be seen in FIG. 8) which are caged locked around the bottom periphery 90 of an interior cavity 92 of the tool 84. The balls 88 are spaced 180° apart from one another about the interior cavity 92.

Three cage locked cylinders, collectively identified by the numeral 94, are spaced 120° apart from one another within the interior of the cavity 92 of the tool 84. Each of the cylinders 94 is offset 60° with respect to one of the balls 88 such that together the balls 88 and the cylinders 94 are alternately spaced around the periphery of the interior cavity 92.

The interior wall 96 of the cavity 92 is conical in shape. The balls 88 and the cylinders 94 are cage locked into the wall 96 and serve as a means for contacting the outside surface of a fastener and inwardly crimping that fastener to distort the same and fasten it to one of the first elements of the invention.

In use with a cylindrical collar, as for instance the collar 70, the tool 84 is rotated and axially compressed onto the collar 70. The malleable material of the collar 70 is initially engaged by the cage locked balls 88 and then by the cage locked cylinders 94. As the tool 84 is pushed down over the collar and is rotated on the collar the malleable material of the collar is progressively distorted by the balls 88 and then the cylinders 94 such that it assumes a conical shape as is illustrated by the conical shape of the swaged collar 76 of FIG. 4.

If the tool 84 is utilized with a polygon shape collar, as for instance the collar 78 of FIGS. 1 and 5, the tool 84 will operate as per the swaging tool described in my above referenced U.S. Pat. 4,682,520 with the exception that the final geometry of the outside surface of the collar will be conical in shape as per the swaged fastener 76 of FIG. 4 and not cylindrical in shape as per the swage fastener 46 of FIG. 2.

Because the collars of the fastening assembly of the invention intimately contact and mimic the shape of the first fastening elements along the entire length of the second zones of the first fastening elements, axial loads between the collars and the pins and bolts of the fastening assemblies of the inventions are evenly transmitted. Because of this, various geometries can be chosen for the collars of the fastening assemblies of the inventions. Further because the loads are evenly transmitted, the height of the collar above the work piece can be reduced to save weight in an assembly.

It is, of course, recognized that the first fastening element can be chosen to have various geometries depending upon its use and the work pieces it is attached to. For illustration of this specification, the first fastening elements of the invention have been illustrated as having countersunk heads. Other head geometries as, for instance hexagon, flat, round, fillister, and the like, can be selected depending upon the work pieces and the environment on which the fastening assemblies of the invention are utilized. Further the first fastening elements could be studs which are locked to appropriate work pieces at one of their ends via appropriate expedients such as pins or the like. Further a first elongated fastening element could including a lock collar of the invention on each end. One of these locking collars would serve as a retaining means preventing movement of the assembly in one direction though work pieces and the other of the locking collars (in the manner of collars 46 and 76 above) would serve to prevent movement in the other direction.

I claim:
1. A fastener system comprising:
   an elongated fastening element having ends, a malleable fastener and a swaging tool,
   said elongated fastening element having retaining means for limiting movement at one of its ends,
   said elongated fastening element further having one of helical threads or circumferentially extending grooves adjacent its other end, said one of said helical threads or circumferentially extending grooves for providing a gripping surface opposing axial movement along said elongated fastening element,
   said elongated fastening element including a plurality of axially extending grooves and ridges of comparable size located on said elongated fastening element between said retaining means and said one of said helical threads or circumferentially extending grooves, said axially extending grooves for providing a gripping surface opposing rotation about said elongated fastening element,
   said malleable fastener being swaged with said swaging tool from an initial state to a swaged state in which it is deformed into intimate contact with axial grooves and one of said threads or in circumferential grooves,
   in said initial state said fastener shaped essentially as a hollow collar having an outside surface and an interior surface, said collar sized and shaped to freely slide on said elongated fastening element over both said axially extending grooves and said one of said helical threads or circumferentially extending grooves,
   in said swaged state said interior surface of said fastener intimately contacting and irreversibly locking against both axial and rotational movement with respect to said elongated fastening element by assuming a complementary shape to said elongated fastening element about both said axially extending grooves and said one of said helical threads or circumferentially extending grooves and by frictional engagement therewith, and
   said swaging tool having a hollow interior, said swaging tool hollow interior including means for contacting said outside surface of said fastener and inwardly crimping said fastener to distort said interior surface of said fastener to intimately contact and complementarily conform to said elongated fastening element about both said axially extending grooves and said one of said helical threads or circumferentially extending grooves.
2. A fastener system of claim 1 wherein:
   said elongated fastening element has helical threads into which said fastener is intimately bonded by swaging.
3. A fastener system of claim 2 wherein:
   said elongated fastening element has circumferentially extending grooves which are axially spaced from one another along said elongated fastening element.
4. A fastening assembly for passing through holes in work pieces to be joined comprising:
   an elongated first fastening element having ends,
   a second fastening element adapted for being nonremovably connected to said first fastening element,
   said first fastening element including a retaining had located at one of said ends for maintaining said first fastening element against axial movement in a first direction in a hole in the work pieces, and a shaft extending away therefrom to the other end,
   said shaft having a first zone and a second zone, said first zone located between said retaining head and said second zone,
   said first zone including a plurality of axially arranged grooves and ridges of comparable size for providing a gripping surface opposing rotation about said first fastening element,
   said second zone of said first fastening element including a plurality of grooves axially spaced from one another long said first fastening element and circumferentially extending around said first fastening element for opposing axial movement along said first fastening element, said second fastening element being made of malleable material and deformable by swaging between a first, initial state and a second, swaged state, in said initial state, said second fastening element shaped essentially as a hollow collar having an outside surface and a thread-free interior surface, said collar being sized and shaped to freely slide on said first fastening element over both said zones whereat said second element is radially swaged into both of said zones of said first element, in said swaged state, said interior surface of said second fastening element intimately contacting and assuming a complementary shape to said first fastening element so as to tightly and frictionally engage both said first zone of said first fastening element and said second zone of said first fastening element, and in said swaged state, said second fastening element being prohibited from rotation on said first fastening element by friction engagement between the second element and the first element throughout the swaged zones and by said complementary shape of said interior surface of said second fastening element interlocking with said grooves and ridges in the first zone and further prohibited from axial movement along said first fastening element by said complementary shape of said interior surface of said second fastening element interlocking with said grooves in said second zone.

5. A fastening assembly of claim 4 wherein:
said first fastening element includes a third zone, said third zone located between said first zone and said retaining-means.

6. A fastening assembly of claim 5 wherein:
said third zone of said first fastening element includes an area shaped as a smooth cylinder for closely fitting in a hole in a work piece to be fastened.

7. A fastening assembly of claim 4 wherein:
said outside surface of said second fastening element in said initial state is polygon shaped in cross section.

8. A fastening assembly of claim 4 wherein:
said outside surface of said second fastening element in said initial state is circular shaped in cross section.

9. A fastening assembly of claim 24 wherein:
said first fastening element comprises a bolt;
said retaining means comprises said bolt having a bolt head at one end; and
said second means comprises threads adjacent the other end of said bolt.

10. A fastening assembly of claim 9 wherein:
said first means includes a plurality of axially extending grooves located on said bolt between said threads and said bolt head.

11. A fastening assembly of claim 10 wherein:
said bolt includes a smooth cylindrical area for closely fitting in a hole in a work piece to be fastened, said smooth cylindrical area located between said plurality of axially extending grooves and said bolt head.

12. A fastening assembly of claim 4 wherein:
in said initial state said interior surface of said second fastening element is spaced from both said first zone of said first fastening element and said second zone of said first fastening element.

13. A fastening assembly comprising:
a bolt,
a malleable fastener,
said bolt having a bolt head at one end and threads adjacent its other end,
said bolt including a plurality of axially extending grooves located on said bolt between said threads and said bolt head, said axially extending grooves for providing a gripping surface opposing rotation about said bolt,
said malleable fastener constructed for fitting over the bolt to surround both the grooves and threads, said fastener being swaged from an initial state to a swaged state into the bolt both in the grooves and with the threads radially inwardly,
in said initial state said fastener shaped essentially as a hollow collar having an outside surface and an interior surface, said collar sized and shaped to freely slide on said bolt over both said grooves and said threads,
in said swaged state said interior surface of said fastener intimately contacting and irreversibly locking against both axial and rotational movement with respect to said bolt by assuming a complementary shape to said bolt about both said grooves and said threads and by functional engagement between the fastener along said grooves and threads.

14. A fastening assembly of claim 13 wherein:
said bolt includes a smooth cylindrical area located between said bolt head and said grooves for fitting in a hole in a work piece to be fastened.

15. The fastening assembly as in claim 4 further in which the grooves in said second zone comprise threads helically extending along said second zone of said first fastening element from said first zone of said first fastening element to the other end of said first fastening element opposite said retaining head.

* * * * *